US010566824B2

(12) United States Patent
Jin

(10) Patent No.: US 10,566,824 B2
(45) Date of Patent: Feb. 18, 2020

(54) WIRELESS POWER TRANSFER MODULE FOR VEHICLES

(71) Applicant: Amosense Co., Ltd., Cheonan-si (KR)

(72) Inventor: Byoung-Su Jin, Suwon-si (KR)

(73) Assignee: Amosense Co., Ltd., Cheonan-si (KR)

( * ) Notice: Subject to any disclaimer, the term of this patent is extended or adjusted under 35 U.S.C. 154(b) by 103 days.

(21) Appl. No.: 15/747,582

(22) PCT Filed: Aug. 2, 2016

(86) PCT No.: PCT/KR2016/008492
§ 371 (c)(1),
(2) Date: Jan. 25, 2018

(87) PCT Pub. No.: WO2017/023080
PCT Pub. Date: Feb. 9, 2017

(65) Prior Publication Data
US 2018/0219400 A1    Aug. 2, 2018

(30) Foreign Application Priority Data

Aug. 4, 2015  (KR) .................. 10-2015-0110189
Aug. 4, 2015  (KR) .................. 10-2015-0110200
Aug. 4, 2015  (KR) .................. 10-2015-0110204

(51) Int. Cl.
*H02J 7/00*    (2006.01)
*H02J 7/02*    (2016.01)
(Continued)

(52) U.S. Cl.
CPC ............ *H02J 7/025* (2013.01); *H01F 27/022* (2013.01); *H01F 27/36* (2013.01); *H01F 38/14* (2013.01);
(Continued)

(58) Field of Classification Search
CPC . H02J 7/025; H02J 50/10; H02J 50/12; H01F 27/022; H01F 27/36; H01F 38/14; H01Q 7/00
(Continued)

(56) References Cited

U.S. PATENT DOCUMENTS 9,252,611 B2    2/2016  Lee et al.
9,397,505 B2    7/2016  Lee et al.
(Continued)

FOREIGN PATENT DOCUMENTS

JP    2014-011852    1/2014
JP    2015-104218    6/2015
(Continued)

OTHER PUBLICATIONS

International Search Report of the ISA/KR dated Nov. 23, 2016; for PCT/KR2016/008492; 4 pages.

*Primary Examiner* — Zixuan Zhou
(74) *Attorney, Agent, or Firm* — Daly, Crowley, Mofford & Durkee, LLP

(57) ABSTRACT

There is provided a wireless power transmission module for a vehicle that includes a housing providing an internal space and including an upper plate on which a portable device to be charged is placed, an antenna unit including a first wireless power transmission antenna operating in a magnetic induction method and a second wireless power transmission antenna operating in a magnetic resonance method, and a shielding unit including a first shielding sheet disposed in an area corresponding to the first wireless power transmission antenna and a second shielding sheet disposed in an area corresponding to the second wireless power transmission antenna. The antenna unit is placed inside the housing so that a first distance from the first wireless power transmission antenna to an outer surface of the upper plate is shorter than (Continued)

a second distance from the second wireless power transmission antenna to the outer surface of the upper plate.

19 Claims, 11 Drawing Sheets

(51) Int. Cl.
| | |
|---|---|
| *H01F 27/02* | (2006.01) |
| *H02J 50/10* | (2016.01) |
| *H02J 50/12* | (2016.01) |
| *H01F 27/36* | (2006.01) |
| *H01F 38/14* | (2006.01) |
| *H01Q 7/00* | (2006.01) |
| *H04W 4/80* | (2018.01) |
| *H04B 5/00* | (2006.01) |

(52) U.S. Cl.
CPC ............... *H01Q 7/00* (2013.01); *H02J 50/10* (2016.02); *H02J 50/12* (2016.02); *H04B 5/0037* (2013.01); *H04B 5/0075* (2013.01); *H04W 4/80* (2018.02)

(58) Field of Classification Search
USPC .......................................... 320/108; 307/104
See application file for complete search history.

(56) References Cited

U.S. PATENT DOCUMENTS

| | | | |
|---|---|---|---|
| 9,413,175 B2 | 8/2016 | Park et al. | |
| 2012/0242276 A1* | 9/2012 | Jung ..................... | H02J 5/005 320/103 |
| 2015/0130409 A1 | 5/2015 | Lee et al. | |
| 2015/0236545 A1 | 8/2015 | Hyun et al. | |
| 2015/0255993 A1* | 9/2015 | Kuerschner ............. | H01F 38/14 307/104 |
| 2015/0326058 A1 | 11/2015 | Koyanagi et al. | |

FOREIGN PATENT DOCUMENTS

| | | |
|---|---|---|
| KR | 10-2013-0072181 | 7/2013 |
| KR | 10-2014-0044022 | 4/2014 |
| KR | 10-2014-0142163 | 12/2014 |
| KR | 10-2015-0047085 | 5/2015 |

* cited by examiner

WIRELESS POWER TRANSFER MODULE FOR VEHICLES

CROSS-REFERENCE TO RELATED APPLICATION

This U.S. non-provisional application claims priority under 35 USC § 119 from Korean Patent Application No. 10-2015-0110189, filed on Aug. 4, 2015, Korean Patent Application No. 10-2015-0110200, filed on Aug. 4, 2015, and Korean Patent Application No. 10-2015-0110204, filed on Aug. 4, 2015 in the Korean Intellectual Property Office (KIPO), the disclosures of which are hereby incorporated by reference in their entirety.

BACKGROUND

1. Technical Field

The present disclosure relates to a wireless power transmission module for a vehicle, and more particularly, to the wireless power transmission module for a vehicle capable of wireless charging of magnetic induction method and magnetic resonance method.

2. Discussion of the Related Art

Recently, there has been a demand for a wireless charging electronic device, for example a portable terminal such as a mobile phone or a smart phone, a tablet PC, a notebook, a digital broadcasting terminal, a personal digital assistant (PDA), a portable multimedia player (PMP), and the like. Specially, the surrounding environment related to the use of the portable terminal is spreading to a dynamic space such as a vehicle.

Accordingly, a non-contact type charging system using a wireless power transmission method has been proposed so that a battery of a terminal can be easily charged even in a vehicle.

The non-contact type charging system provides electric energy supplied from a vehicle power source to the terminal by the wireless transmission method. The charging system includes a wireless power transmission module embedded in the vehicle, and a wireless power reception module of the terminal to receive the electric energy from the wireless power transmission module.

The non-contact type wireless charging may be classified into a magnetic induction method and a magnetic resonance method, or a power matters alliance (PMA) standard method and a Qi standard method depending on a method of detecting the wireless power reception module accessing to the wireless power transmission module.

The magnetic induction method and the magnetic resonance method described above are the same technologies in that these are using an electromagnetic field and the electromagnetic field is generated by using a coil and electric power is transmitted through the electromagnetic field. However, the magnetic induction method is different from the magnetic resonance method uses electromagnetic resonance between coils whereas the magnetic resonance method uses the electromagnetic resonance between the coils. Further, the operating frequencies of the two methods are different from each other.

For example, the magnetic induction method has an operating frequency band of 100 kHz to 350 kHz, and the magnetic resonance method has an operating frequency band of 6.765 MHz to 6.795 MHz.

Accordingly, there is a problem that the magnetic induction method and the magnetic resonance method are not compatible with each other because their operating frequencies are different from each other.

Meanwhile, in case the magnetic resonance method operating in the high operating frequency band of 6.765 MHz to 6.795 MHz, if the coupling coefficient between the coils is excessively high, the charging efficiency is reduced due to splitting. In case the magnetic induction method operating in the low operating frequency band of 100 kHz to 350 kHz, the higher the coupling coefficient, the higher charging efficiency.

Therefore, in case the magnetic induction method and the magnetic resonance method are applied together, there is a demand for increasing the charging efficiencies through all antennas operating in the magnetic induction method as well as the magnetic resonance method.

SUMMARY

To solve the above problem and defects, it is an object of the present disclosure to provide a wireless power transmission module for a vehicle which can perform wireless charging using both a magnetic induction method and a magnetic resonance method by disposing together two wireless power transmission antennas having different charging schemes.

In addition, it is another object of the present disclosure to provide a wireless power transmission module for the vehicle which can perform wireless charging using all of a Qi standard method, a PMA standard method, and a magnetic resonance method through one module, by configuring so that antenna operating in the magnetic induction method includes the antennas operating in the Qi and PMA standard methods.

In the meantime, it is another object of the present disclosure to provide a wireless power transmission module for the vehicle which can increase the charging efficiencies of the magnetic induction method and the magnetic resonance method, by maintaining a distance between a contact surface of a portable device to be charged and the wireless power transmission antenna to be structurally appropriate.

Further, it is another object of the present disclosure to provide the wireless power transmission module for the vehicle which can further perform any other function through one module in addition to the wireless charging, by including a near field communication (NFC) antenna for short-range data communication in addition to the wireless power transmission antenna.

To accomplish the above objects of the present disclosure, there is provided a wireless power transmission module for a vehicle that includes: a housing providing an internal space and including an upper plate on which a portable device to be charged is placed; an antenna unit including a first wireless power transmission antenna operating in a magnetic induction method and a second wireless power transmission antenna operating in a magnetic resonance method; and a shielding unit including a first shielding sheet disposed in an area corresponding to the first wireless power transmission antenna and a second shielding sheet disposed in an area corresponding to the second wireless power transmission antenna, wherein the antenna unit is placed inside the housing so that a first distance from the first wireless power transmission antenna to an outer surface of the upper plate is shorter than a second distance from the second wireless power transmission antenna to the outer surface of the upper plate.

The first distance may be set so that a coupling coefficient k between a reception coil included in the portable device and the first wireless power transmission antenna is 0.7 or more. The second distance may be set so that a coupling coefficient k between the reception coil included in the portable device and the second wireless power transmission antenna is less than 0.2. For example, the first distance may be 2 mm to 5 mm, and the second distance may be 10 mm to 50 mm.

In addition, the first wireless power transmission antenna may include a first antenna operating in a Qi standard method and a second antenna operating in a PMA standard method.

A surface of the shielding sheet on which the first wireless power transmission antenna is disposed may form be a stepped surface having a height difference with respect to a surface of the second shielding sheet on which the second wireless power transmission antenna is disposed.

In addition, the surface of the first shielding sheet on which the first wireless power transmission antenna is disposed may be higher by a predetermined height than the surface of the second shielding sheet on which the second wireless power transmission antenna is disposed.

The first shielding sheet may have a relatively smaller area than that of the second shielding sheet, and may be stacked on a side of the second shielding sheet.

Further, the first shielding sheet may be disposed inside the second shielding sheet, and the second shielding sheet may be formed with receiving portion for receiving a part or all of an entire thickness of the first shielding sheet.

The first wireless power transmission antenna and the second wireless power transmission antenna may be disposed on a first region and a second region, respectively, which are located on opposite sides with respect to a virtual boundary line.

Further, the housing may include a seating surface on which the first shielding sheet and the second shielding sheet are seated, and the seating surface may include a first portion on which the first shielding sheet is disposed and a second portion on which the second shielding sheet is disposed. A surface of the second portion may form a stepped surface having a height difference with respect to a surface of the first portion.

In addition, the first shielding sheet may be disposed in the first region, the second shielding sheet may be disposed in the second region, and the first shielding sheet may have a relatively thicker thickness than that of the second shielding sheet.

The upper plate may include a first upper plate disposed in an upper area of the first wireless power transmission antenna and a second upper plate disposed in an upper area of the second wireless power transmission antenna. An outer surface of the first upper plate may form a stepped surface having a height difference with respect to an outer surface of the second upper plate.

In addition, the antenna unit may further include a NFC antenna for short range data communication, and the NFC antenna may be disposed in an area corresponding to the second shielding sheet.

The first shielding sheet may have a relatively higher permeability than that of the second shielding sheet in the operating frequency band of 100 kHz to 350 kHz. When the first shielding sheet has the same permeability as the second shielding sheet, the permeability loss rate of the first shielding sheet may be smaller than that of the second shielding sheet.

The second shielding sheet may have a relatively higher permeability than that of the first shielding sheet in the operating frequency band of 6.765 MHz to 6.795 MHz and at the operating frequency of 13.56 MHz. When the second shielding sheet has the same permeability as the first shielding sheet, the permeability loss rate of the second shielding sheet may be smaller than that of the first shielding sheet.

The first shielding sheet is made from a material having a magnetic permeability of 300 to 3500, a Tan $\Delta(=\mu''/\mu')$ of 0.05 or less, and a magnetic flux density of 0.25 T or more in the operating frequency band of 100 kHz to 350 kHz. The second shielding sheet is made from a material having a magnetic permeability of 30 to 350, a Tan $\Delta(=\mu''/\mu')$ of 0.05 or less in an operating frequency band of 6.765 MHz to 6.795 MHz and at a frequency of 13.56 MHz and a magnetic flux density of 0.25T or more in the operating frequency band of 6.765 MHz to 6.795 MHz. (Here, $\mu'$ is the permeability and $\mu''$ is the permeability loss rate)

The first shielding sheet may be any one of a Mn—Zn ferrite having a permeability of 2000 to 3500 and Tan $\Delta(=\mu''/\mu')$ of 0.05 or less in the operating frequency band of 100 kHz to 350 kHz, and a Ni—Zn ferrite having a permeability of 300 to 1500 and Tan $\Delta(=\mu''/\mu')$ of 0.05 or less in the operating frequency band of 100 kHz to 350 kHz. The second shielding sheet may be any one of a Ni—Zn ferrite having a permeability of 100 to 350 and Tan $\Delta(=\mu''/\mu')$ of 0.05 or less in the operating frequency band of 6.765 MHz to 6.795 MHz and at the frequency of 13.56 MHz, and a metal polymer having a permeability of 30 to 70 and Tan $\Delta(=\mu''/\mu')$ of 0.05 or less in the operating frequency band of 6.765 MHz to 6.795 MHz.

The first shielding sheet and the second shielding sheet may include at least one of a ribbon sheet including at least one of an amorphous alloy and a nanocrystalline alloy, a ferrite sheet and a metal polymer sheet.

Also, any one of the first shielding sheet and the second shielding sheet may include a plurality of divided fine pieces.

According to the present disclosure, by providing at least two wireless power transmission antennas operating in different charging methods together, it is possible to use the magnetic induction method and the magnetic resonance method, specifically the Qi standard method, the PMA standard method, and the magnetic resonance method for wireless charging, thereby enhancing the compatibility and improving the usability.

Further, according to the present disclosure, two wireless power transmission antennas having different charging schemes are separately disposed in different areas, so that the user can be positioned correctly at a suitable position with respect to the charging method of the portable device, thereby enhancing the charging efficiency.

In addition, since the antenna unit includes the NFC antenna for short range data communication, it is possible to transmit and receive data as well as wireless power charging through one module, thereby implementing multifunction.

Further, the present disclosure can increase the charging efficiency of both the magnetic induction method and the magnetic resonance method, by disposing different distances between the contact surfaces of the portable device to be charged and the wireless power transmission antennas each other and structurally maintaining appropriate distances.

BRIEF DESCRIPTION OF THE DRAWINGS

FIG. 4A shows a case where the receiving portion is formed as a through-hole and FIG. 4B shows a case where the receiving portion is formed as a receiving sink.

FIG. 9A shows a case where the bottom surface of a housing is formed in a stepped structure. FIG. 9B shows a case where the first sheet is stacked on the second sheet. FIG. 9C shows a case where the upper plate of the housing is formed in a stepped structure.

FIG. 10A is a schematic view showing the arrangement of among the plurality of antennas. FIG. 10B is a view showing a case where the first sheet is stacked on the upper portion of the second sheet. FIG. 10C is a view showing a case where the bottom surface of the housing is formed in a stepped structure.

DETAILED DESCRIPTION OF THE EMBODIMENTS

Figure 1:
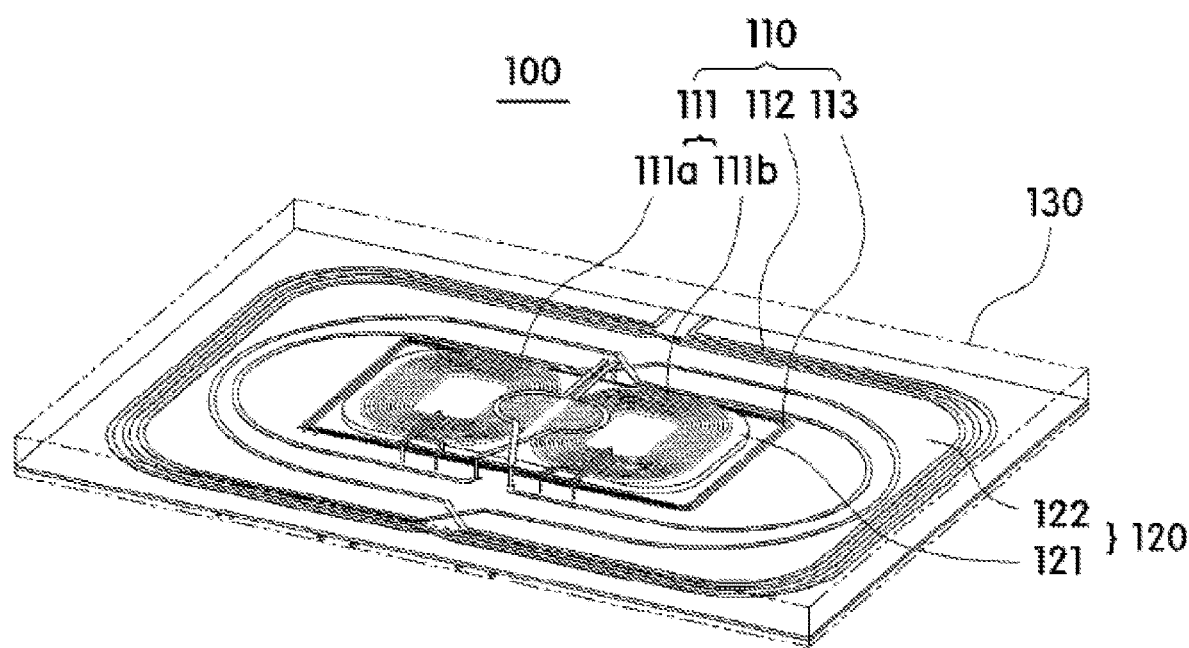
FIG. 1 is a schematic view showing a wireless power transmission module for a vehicle according to an embodiment of the present disclosure.

Hereinafter, exemplary embodiments of the present disclosure will be described in detail with reference to the accompanying drawings, which will be readily apparent to those skilled in the art to which the present disclosure pertains. The present disclosure may be embodied in many different forms and is not limited to the embodiments described herein. In the drawings, parts not relating to the description are omitted for clarifying the present disclosure, and the same reference numerals are assigned to the same or similar components throughout the specification.

Figure 6:
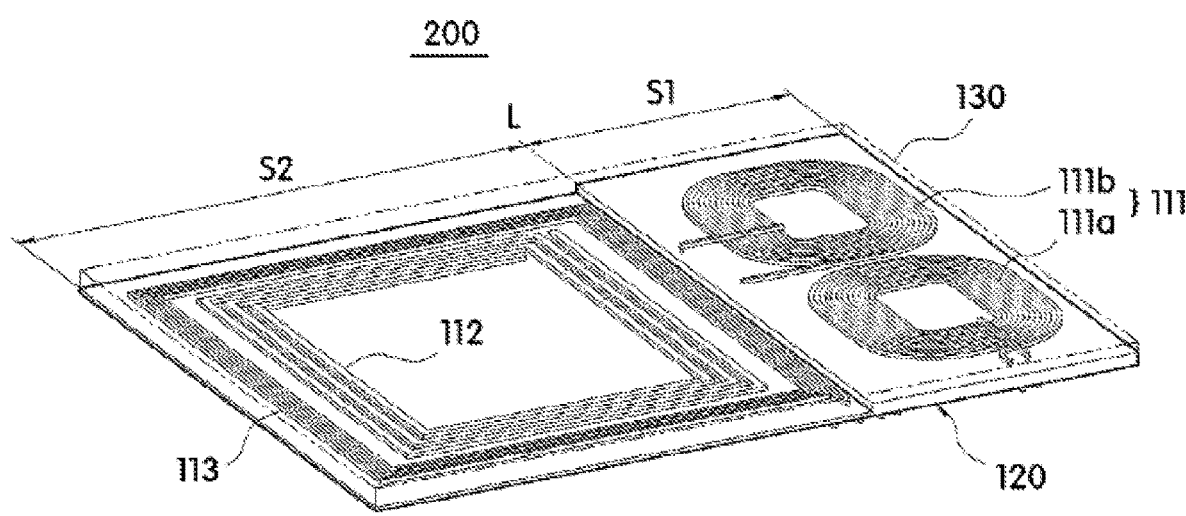
FIG. 6 is a schematic view of the wireless power transmission module for the vehicle according to another embodiment of the present disclosure.

In an exemplary embodiment, a wireless power transmission module for a vehicle 100 or 200 installed in the vehicle is for transmitting a wireless power signal to a portable device to be charged. As shown in FIGS. 1 and 6, the wireless power transmission module 100 or 200 for the vehicle may include a housing 130, an antenna unit 110, and a shielding unit 120.

The housing 130 may be provided as a housing figure providing an internal space for including the antenna unit 110 and the shielding unit 120. The housing 130 may include an upper plate 132 on which the portable device to be charged is placed. A seating surface 134 on which the shielding unit 120 is disposed is provided the internal space.

Here, the seating surface 134 may be a bottom surface of the internal space, or a surface of a separate supporting member disposed in the middle portion of the internal space. In addition, an outer surface of the upper plate 132 may be a contact surface with which the portable device contacts.

Accordingly, when the portable device is placed on the outer surface of the upper plate 132, a battery of the portable device may be charged by the wireless power transmitted from the antenna unit 110 disposed in the internal space. Here, a wireless power reception module may be embedded in the portable device for receiving wireless power transmitted from the antenna unit 110 operating in a magnetic induction method or a magnetic resonance method.

In the present disclosure, not shown in here, the internal space of the housing 130 may include ordinary components for performing a functions as a charger such as a power supply circuit unit supplied power from the vehicle power supply, an antenna driving circuit unit for transmitting power supplied through the power supply circuit unit to the antenna unit 110 and transmitting power to the portable device to be charged, a control circuit unit for controlling all operations including a driving control of the antenna driving circuit unit and a control of power transmission, and the like. The portable device may be a mobile phone, a PDA, a PMP, a tablet, a multimedia device, or the like.

The antenna unit 110 includes at least two wireless power transmission antennas 111 and 112 that operate with different methods in different operating frequency bands. Accordingly, the wireless power transmission antennas 111 and 112 may transmit power required by the portable device with different methods.

In an exemplary embodiment, the wireless power transmission module for the vehicle 100 or 200 may be a combo type in which an NFC antenna 113 is included in the antenna unit 110 so that possible data transmission and reception as well as the wireless charging.

Figure 2:
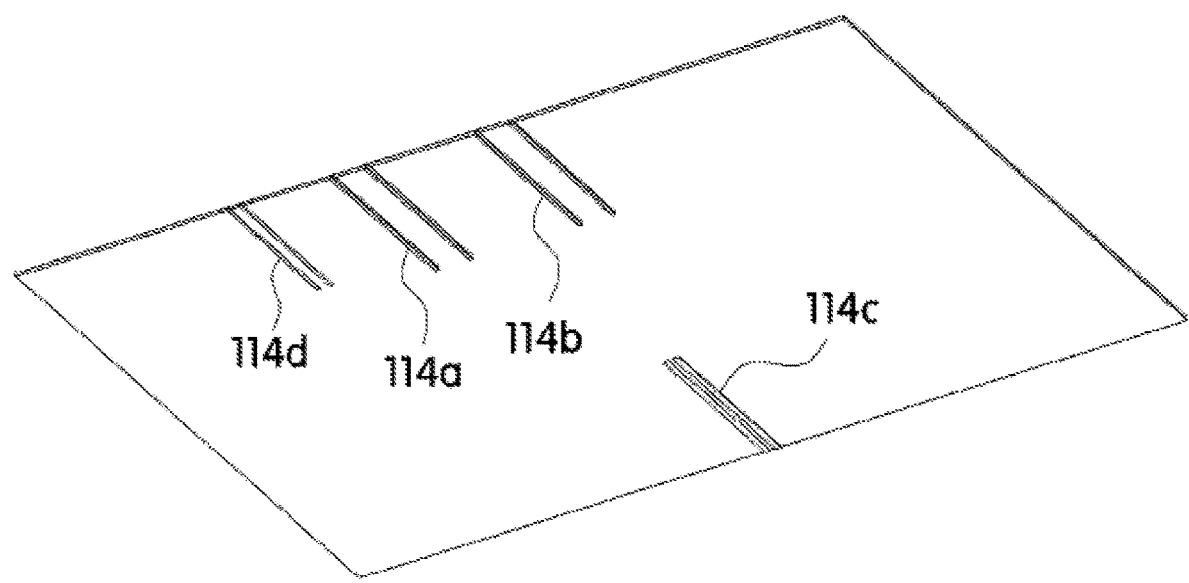
FIG. 2 is a bottom view of the wireless power transmission module for the vehicle shown in FIG. 1.
Figure 7:
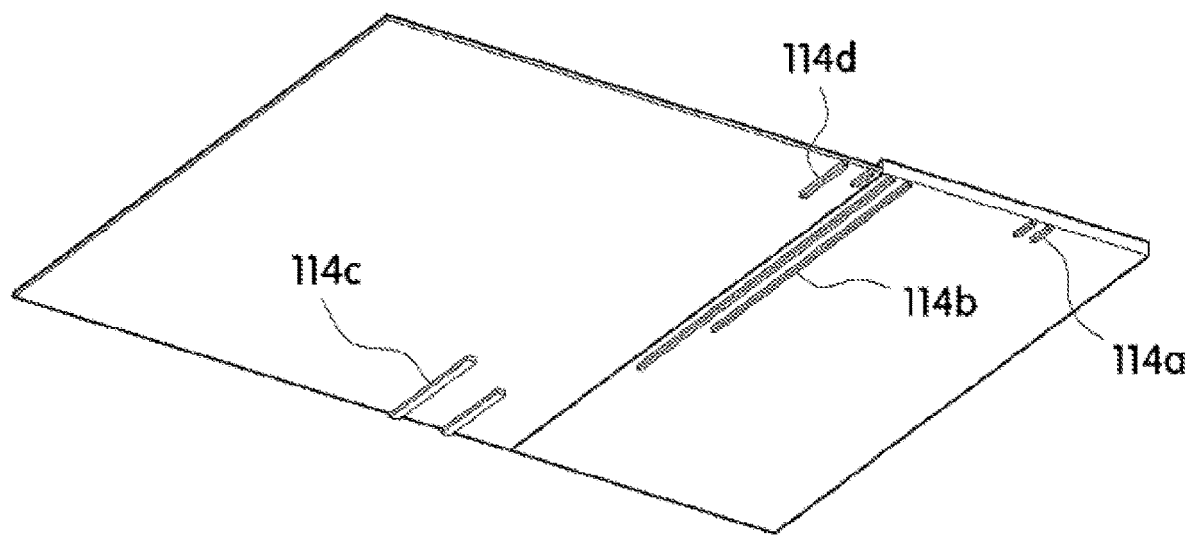
FIG. 7 is a bottom view of the shielding unit shown in FIG. 6.

In the present disclosure, the wireless power transmission antennas 111 and 112 and the NFC antenna 113 may be formed of flat coils in which conductive members having a predetermined length are wound a plurality of times in a clockwise direction or counterclockwise direction. Here, the conductive member may be made from a conductive metal such as copper or provided such that a plurality of strands having a predetermined diameter are twisted along the longitudinal direction. When the wireless power transmission antennas 111 and 112 and the NFC antenna 113 are formed of flat coils, lead wires 114a, 114b, 114c, and 114d for electrical connection with the respective antenna 111, 112 or 113 may be disposed on the bottom surface place of the shielding unit 120 (refer to FIGS. 2 and 7).

The wireless power transmission antennas 111 and 112 and the NFC antenna 113 may be loop-shaped coil patterns which can be made by patterning a conductor such as a copper foil on at least one surface of a circuit board made from synthetic resin such as polyimide (PI), polyethylene terephthalate (PET), or the like, or by using conductive ink.

In addition, the wireless power transmission antennas 111 and 112 and the NFC antenna 113 may be formed by a combination of a flat coil in which a conductive member is wound a plurality of times and an antenna pattern formed on one side of the circuit board.

The wireless power transmission antennas 111 and 112 may include a first wireless power transmission antenna 111 operating in the magnetic induction method and a second wireless power transmission antenna 112 operating in the magnetic resonance method.

For example, the first wireless power transmission antenna 111 may be an antenna operating in the magnetic induction method in the operating frequency band of 100 to 350 kHz, and the second wireless power transmission antenna 112 may be an alliance for wireless power (A4WP) standard method antenna operating in the magnetic resonance method in the operating frequency band of 6.765 to 6.795 MHz.

That is, in the present disclosure, as the antenna unit 110 may include the first wireless power transmission antenna 111 operating in a magnetic induction method and the second wireless power transmission antenna 112 operating in a magnetic resonance method, respectively, the wireless charging of two methods may be performed through one module.

Here, the first wireless power transmission antenna 111 operating in the magnetic induction method may include antennas operating in the Qi standard method and the PMA standard method. Preferably, a first antenna 111a is an antenna operating in the Qi standard method and a second antenna 111b is an antenna operating in the PMA standard method. In addition, the number of the first wireless power transmission antenna 111 may be three, and one of the antennas may be partially overlapped with the other two antennas (refer to FIGS. 5 and 11). It is also noted that the first wireless power transmission antenna 111 may be integrated the Qi standard method and the PMA standard method through one coil.

Accordingly, the wireless power transmission modules 100 and 200 for the vehicle installed in the vehicle may perform the wireless charging using all of the Qi standard method, the PMA standard method, and the A4WP standard method which have different operating frequencies or operating methods. Therefore, even if the portable device such as a mobile phone to be charged is wirelessly charged using any one of magnetic induction method and magnetic resonance method, the wireless charging may be performed by the method compatible with the wireless charging method of the portable device, through the wireless power transmission antenna, so that all kinds of wireless charging may be performed without replacing the wireless power transmission module installed in the vehicle.

Figure 5:
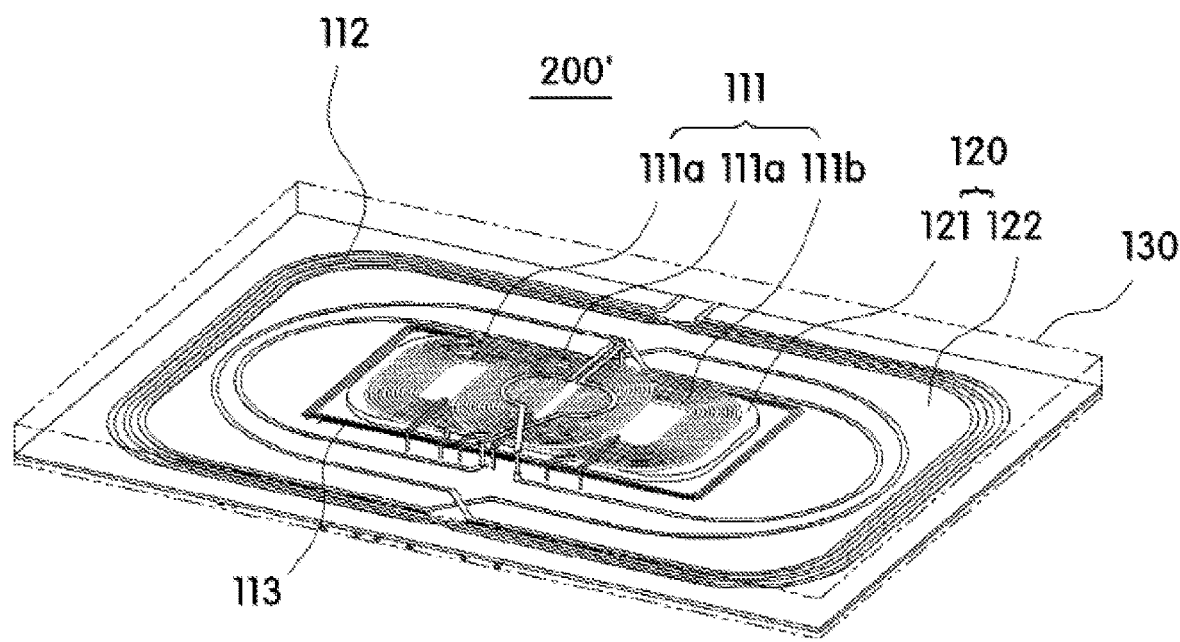
FIG. 5 is a schematic view showing cases where three antennas for the first wireless power transmission are provided in the wireless power transmission module for the vehicle according to the embodiment of the present disclosure.

In an exemplary embodiment of the present disclosure, the first wireless power transmission antenna 111 may be disposed inside the second wireless power transmission antenna 112 (refer to FIGS. 1 and 5).

Figure 11:
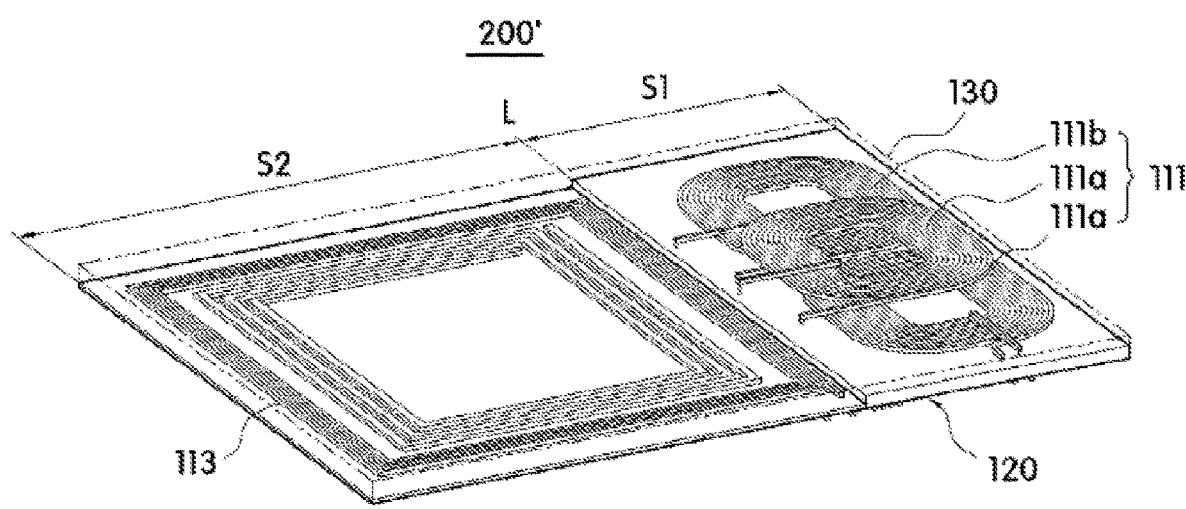
FIG. 11 is a schematic view showing a case where three antennas for the first wireless power transmission are provided in the wireless power transmission module for the vehicle according to an embodiment of the present disclosure.

The first wireless power transmission antenna 111 and the second wireless power transmission antenna 112 may be disposed on both sides of a virtual boundary line L (refer to FIGS. 6 and 11). That is, the first wireless power transmission antenna 111 may be disposed in a first region S1 formed on a side of the virtual boundary line L. The second wireless power transmission antenna 112 may be disposed in a second region S2 formed on the other side of the virtual boundary line L. The first region S1 may be the right side of the virtual boundary line L in the figure, and the second area S2 may be the left side of the virtual boundary line L in the figure. According to an exemplary embodiment of the present disclosure, in case the wireless power transmission modules for the vehicle 200 and 200', the first wireless power transmission antenna 111 and the second wireless power transmission antenna 112 operating in different methods from each other may be disposed in different regions. Accordingly, the user may be placed the portable device on the corresponding positions according to the charging method of the portable device to be charged.

The antenna unit 110 may include the NFC antenna 113 for short range communication in addition to the first and second wireless power transmission antennas 111 and 112.

In an exemplary embodiment, the antenna unit 110 may a complex antenna that may perform the short-range data communication as well as the wireless charging of the magnetic induction method and the magnetic resonance method.

Here, the data transmitted and received through the NFC antenna 113 may be various kinds of information regarding to a status information of the vehicle such as a gasoline amount, a wear state of various consumable items of the vehicle, an operation state of a brake, and the like and the data exchanges may be performed by the portable device such as the mobile phone described above.

When the first wireless power transmission antenna 111 is disposed inside the second wireless power transmission antenna 112, the NFC antenna 113 may be disposed between the first wireless power transmission antenna 111 and the second wireless power transmission antenna 112 (refer to FIGS. 1 and 5).

When the first wireless power transmission antenna 111 and the second wireless power transmission antenna 112 are disposed on both sides of a virtual boundary line L, the NFC antenna may be disposed on the first region S1 where the first wireless power transmission antenna 111 is disposed (refer to FIGS. 10A and 10B), and may be disposed on the second region S2 where the second wireless power transmission antenna 112 is disposed. (refer to FIGS. 8 to 9C).

When the NFC antenna 113 is disposed on the first region S1, the NFC antenna 113 is preferably disposed outside the first wireless power antenna 111 so as to surround the first wireless power transmission antenna 111. When the NFC antenna 113 is disposed on the second region S2, NFC antenna 113 is preferably disposed outside the second wireless power antenna 112 so as to surround the second wireless power transmission antenna 112. This is because the NFC antenna 113 for data transmission/reception is disposed between the first wireless power transmission antenna 111 and the second wireless power transmission antenna 112 for the power transmission, the first wireless power transmission antenna 111 and the second wireless power transmission antenna 112 may be prevented from being located too close to each other 112 to reduce the degradation of characteristics which is caused by mutual interference.

The shielding unit 120 may be disposed on one surface of the antenna unit 110 to shield a magnetic field generated by the antenna unit 110.

That is, the shielding unit 120 may shield the magnetic field generated when the antenna unit 110 transmits and receives the wireless signal in a predetermined frequency band, thereby increasing the condensing speed of the magnetic field in a desired direction, and improving the performance of the corresponding antenna operating in a predetermined frequency band.

For this, the shielding sheet 120 may be made from a magnetic material to shield the magnetic field generated from the antenna unit 110. Here, the shielding sheets 120 may include plate-type magnetic shielding sheets 121 and 122 having a predetermined area and a protective film 125 attached to at least one surface of the shielding sheets 121 and 122 to protect the shielding sheets 121 and 122.

The shielding sheets 121 and 122 may include at least one of a ribbon sheet including at least one of an amorphous alloy and a nanocrystal alloy, a ferrite sheet, and a polymer sheet. Here, the ferrite sheet may be a sintered ferrite sheet, and may include a Ni—Zn ferrite sheet or a Mn—Zn ferrite sheet. In addition, the amorphous alloy or the nanocrystal alloy may include a Fe-based or a Co-based magnetic alloy. The polymer sheet may be a Fe—Si—Al-based metal polymer sheet or a Fe—Si—Cr-based metal polymer sheet.

At this time, the shielding sheets 121 and 122 may have a saturation magnetic flux density of 0.25 Tesla or more in the operating frequency band of 100 kHz to 350 kHz and in the operating frequency band of 6.765 MHz to 6.795 MHz.

Preferably, the wireless power transmission antennas 111 and 112 may operate in a saturation magnetic flux density of 0.35 Tesla or more in the operating frequency band of 100 kHz to 350 kHz and in the operating frequency band of 6.765 MHz to 6.795 MHz. This is because as the saturation magnetic flux density of the shielding sheet becomes higher, the saturation by the magnetic field occurs later. Thus, the shielding sheet having a higher saturation magnetic flux density may have a relatively thinner thickness than that of the shielding sheet having a lower saturation magnetic flux density.

The shielding sheets 121 and 122 may be made from a material having Tan $\Delta(=\mu''/\mu')$ of 0.05 or less in the operating frequency band of 100 kHz to 350 kHz, in the operating frequency band of 6.765 MHz to 6.795 MHz, and at the operating frequency of 13.56 MHz in which the respective antenna 111, 112, or 113 is operated (Here, $\mu'$ is the permeability and $\mu''$ is the permeability loss rate).

The shielding sheets 121 and 122 may be provided by stacking a plurality of magnetic sheets 111a, 111b and 111c. The shielding sheet 110 may include a plurality of divided fine pieces, and the plurality of divided fine pieces may be totally or partially insulated from each other. The plurality of pieces may have a size of 1 μm to 3 mm, and respective pieces may have irregular shapes.

Figure 12:
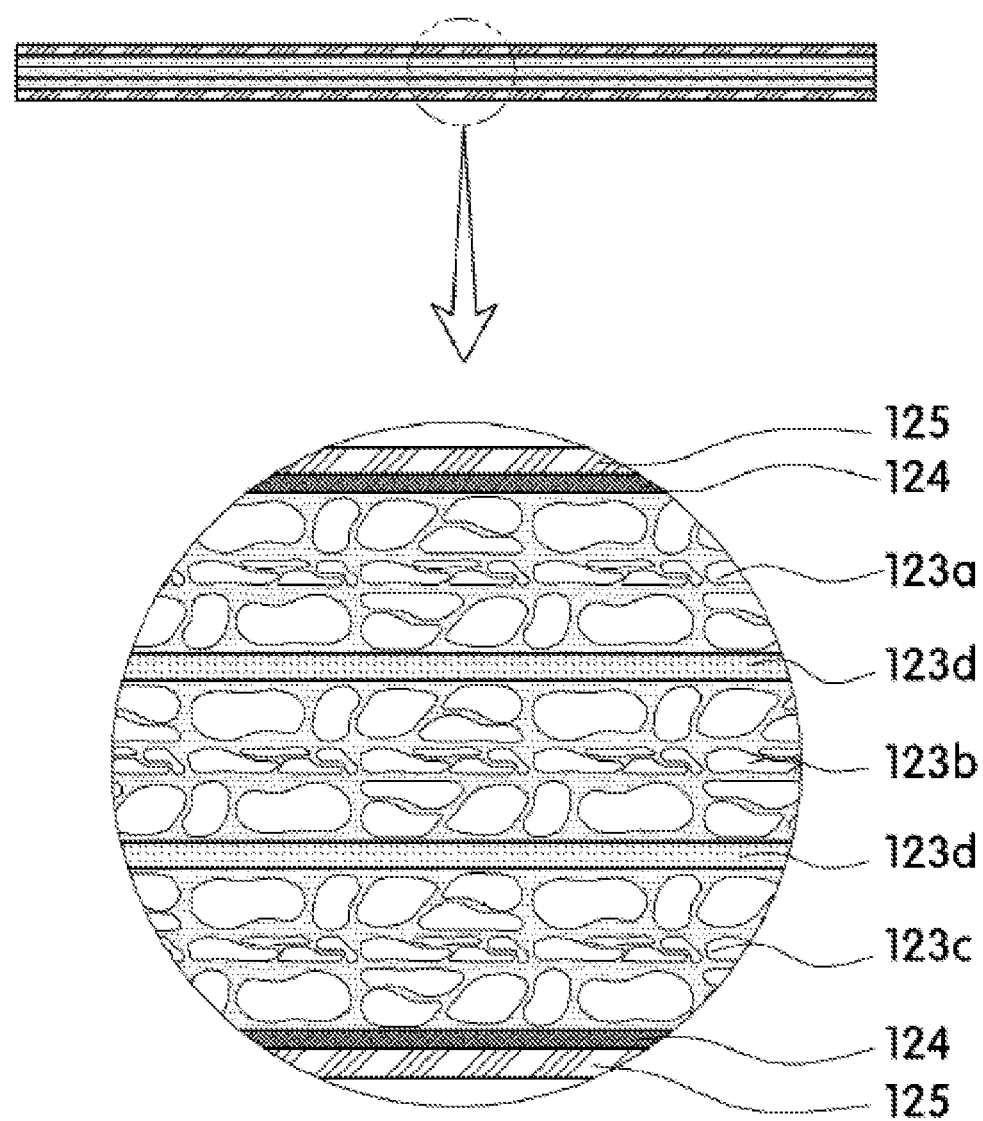
FIG. 12 is a view showing a shielding sheet, in which a plurality of ribbon sheets including at least one of amorphous alloys or nano-crystal alloy are laminated, for a wireless power transmission module for the vehicle according to an embodiment of the present disclosure.

For example, as shown in FIG. 12, the shielding sheets 121 and 122 may be provided by stacking a plurality of ribbon sheets 123a, 123b, and 123c including at least one of a plurality of amorphous alloys and nanocrystalline alloys. Here, each of the ribbon sheets 123a, 123b, or 123c may include a plurality of divided fine pieces so as to suppress the generation of eddy current by increasing the overall resistance, and the adjacent fine pieces may be totally or partially insulated from each other.

At this time, the plurality of ribbon sheets 123a, 123b, and 123c may be laminated via an adhesive member 123d, and the adhesive member 123d may include a nonconductive component. Accordingly, the adhesive member 123d may permeate into a pair of the ribbon sheets where a part or all of sheets are laminated to each other, and move to gaps of the fine pieces, thereby insulating adjacent fine pieces. Here, the adhesive member 123d may be an inorganic-material-type adhesive agent in liquid or gel form, or may be a substrate-type in which an adhesive agent is applied to a side or both sides of a film type substrate.

The shielding unit may include a plurality of shielding sheets 121 and 122 (not shown here) to increase the performance of the corresponding antenna with respect to the first wireless power transmission antenna 111 and the second wireless power transmission antenna 112 using different frequency bands, respectively.

For example, the shielding sheet may include a first shielding sheet 121 and a second shielding sheet 122 having different characteristics in a predetermined frequency band to improve the performance of the first wireless power transmission antenna 111 and the second wireless power transmission antenna 112 that operate in the magnetic induction method and the magnetic resonance method, respectively, in different frequency bands.

At this time, even though the NFC antenna 113 may be appropriately disposed any one side of the first shielding sheet 121 or the second shielding sheet 122 as described above, the NFC antenna 113 may be disposed on one side of the second shielding sheet 122 together with the second wireless power transmission antenna 112. This is for improving the performance of two antennas whose operating frequencies are close to each other, through one shielding sheet. That is, the NFC antenna 113 having the operating frequency of 13.56 MHz may be disposed on one side of the second shielding sheet 122 together with the second wireless power transmission antenna 112 having the operating frequency of 6.765 MHz to 6.795 MHz.

More specifically, the first shielding sheet 121 may be disposed on an area corresponding to the first wireless power transmitting antenna 111 to improve the performance of the wireless power transmission antenna 111 operating in a magnetic induction method in the low operating frequency band. The second shielding sheet 122 may be disposed on an area corresponding to the second wireless power transmission antenna 112 and the NFC antenna 113 to improve all of performances of the second wireless power transmission antenna 112 operating in the magnetic resonance method in the high frequency band and NFC antenna 113.

Here, the first shielding sheet 121 may have an area which can fully cover the first wireless power transmission antenna 111, and the second shielding sheet 122 may have an area which can fully cover the second wireless power transmission antenna 112 and the NFC antenna 113.

For example, when the first wireless power transmission antenna 111 is disposed inside the second wireless power transmission antenna 112, the first shielding sheet 121 may be disposed inside the second shielding sheet 122.

Figure 3:
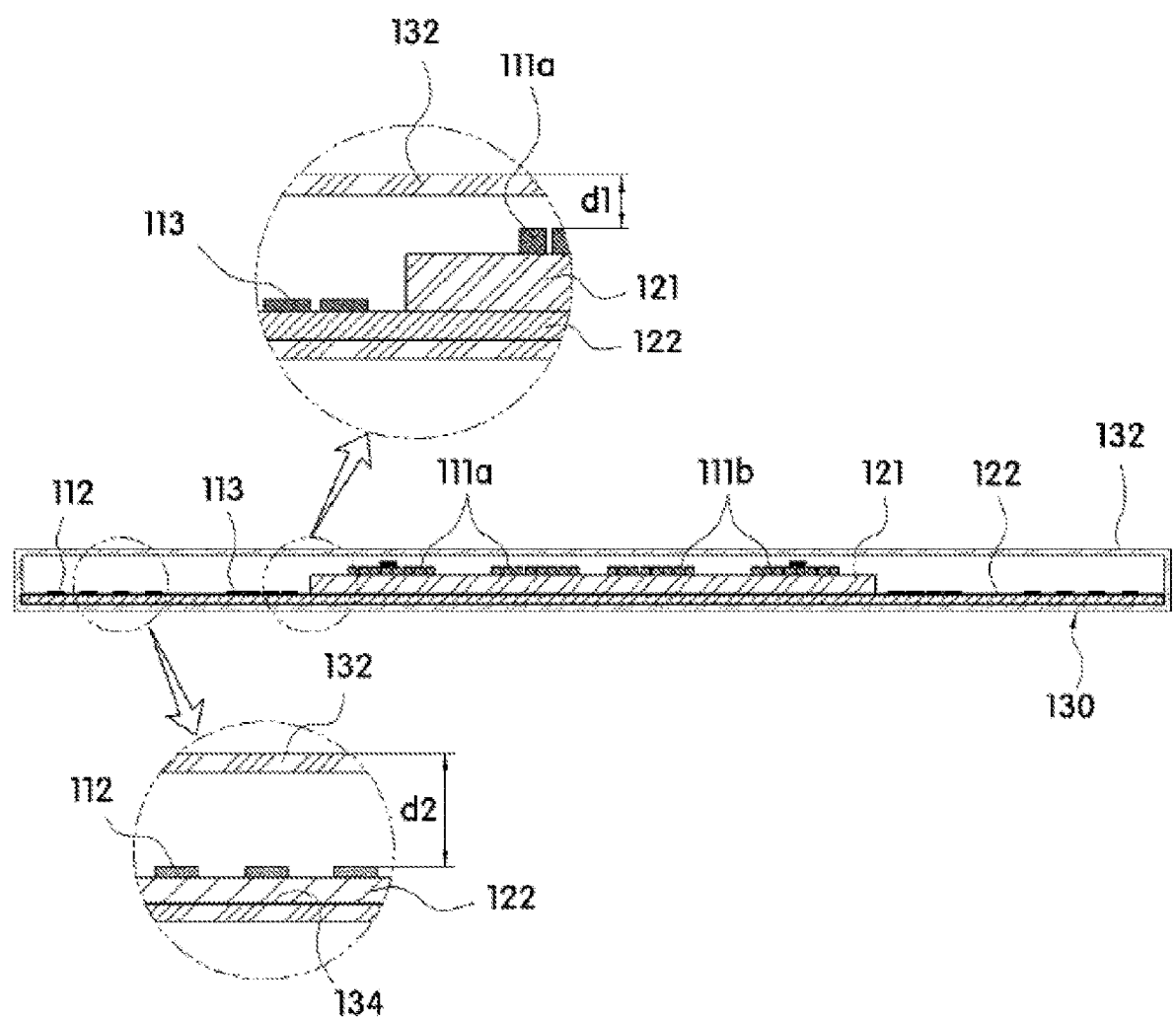
FIG. 3 is a cross-sectional view along the line A-A in FIG. 1.

In this case, the first shielding sheet 121 may have a relatively narrower area than that of the second shielding sheet 122, and be stacked on a side of the second shielding sheet 122 (refer to FIG. 3).

Figure 4A:
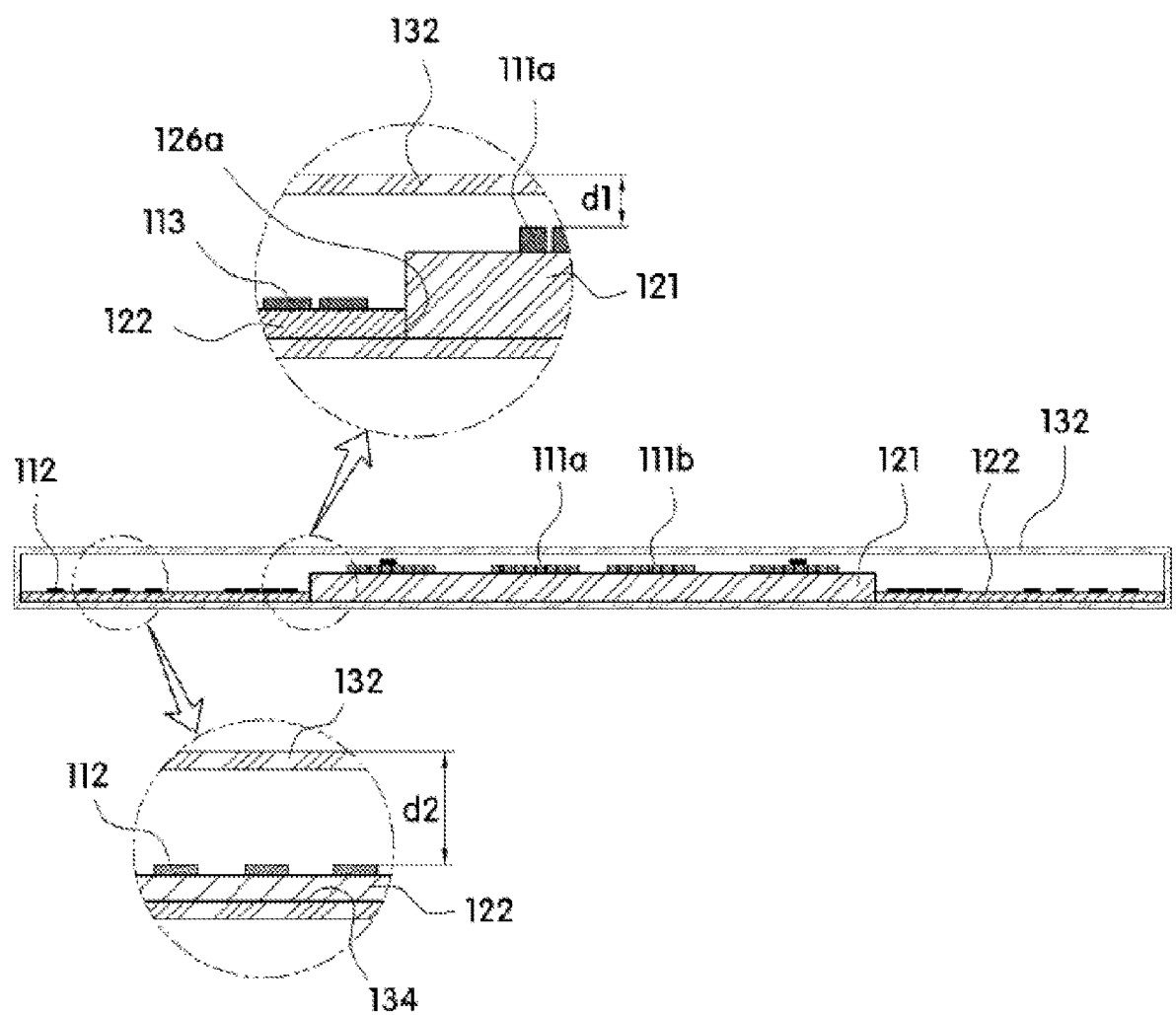
FIG. 4A and FIG. 4B show cases where a receiving portion is formed on a second sheet in the wireless power transmission module for the vehicle according to an embodiment of the present disclosure. In particular.
Figure 4B:
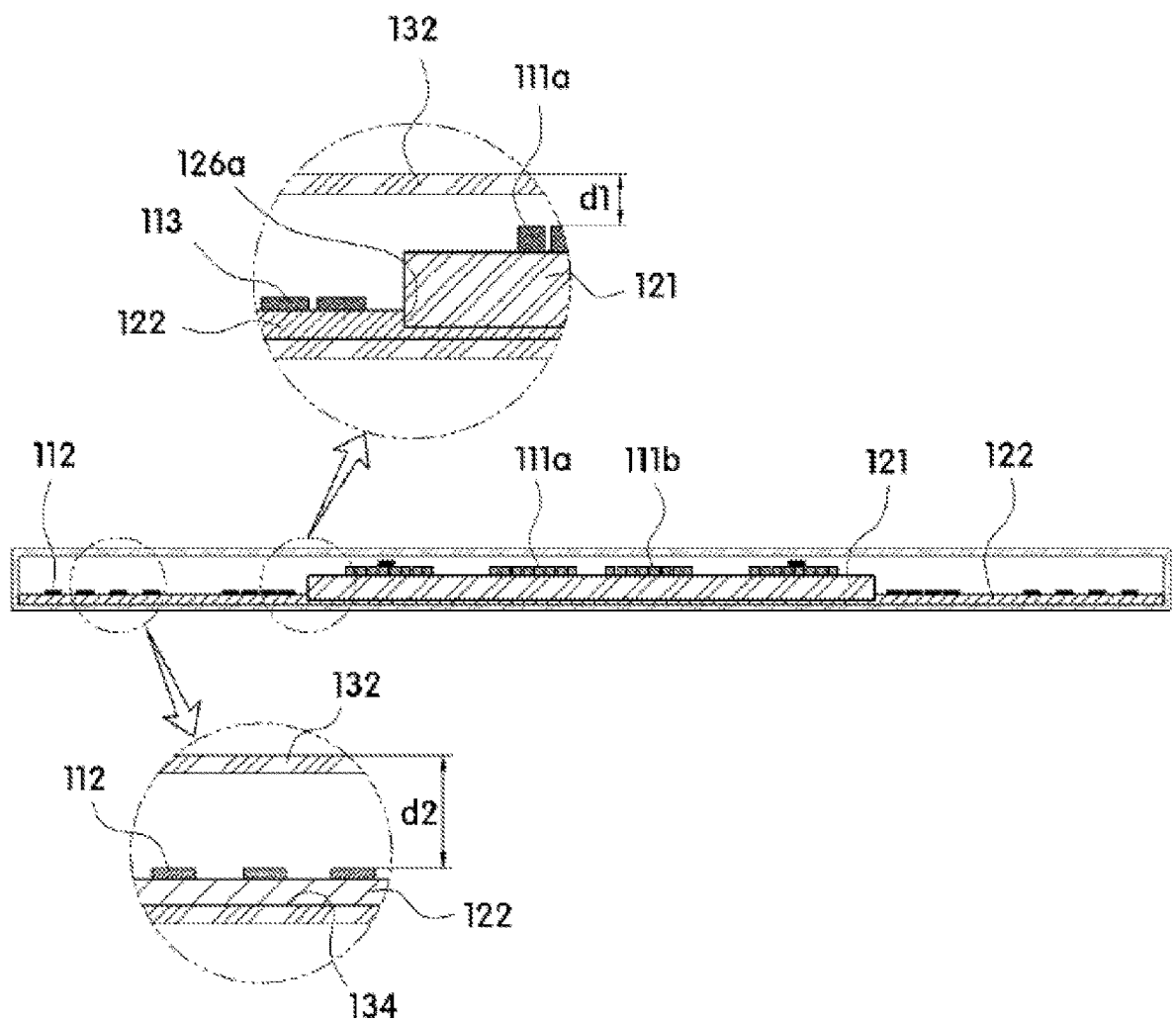

In addition, the shielding unit 120 may be formed of receiving a part of the thickness of the first shielding sheet 121 by having a receiving portion inside the second shielding sheet 122 (refer to FIGS. 4A and 4B). Here, the receiving portion may be in the form of a through hole 126a passing through the second shielding sheet 122, and the first shielding sheet 121 may be inserted into the through hole 126a (refer to FIG. 4A). The receiving portion may be provided in the form of a receiving sink 126b formed to be dented at a predetermined depth from a surface of the second shielding sheet 122, so that the first shielding sheet 121 is seated in the receiving sink 126b (refer to FIG. 4B).

In another exemplary embodiment of present disclosure, when the first wireless power transmission antenna 111 and the second wireless power transmission antenna 112 are disposed on both sides of the virtual boundary line L, the first shielding sheet 121 may be disposed on the first region S1 corresponding to the first wireless power transmission antenna 111 and the second shielding sheet 122 may be disposed on an area corresponding the second wireless power transmission antenna 112 and the NFC antenna 113, respectively (refer to FIGS. 8, 9A, 9C, and 10C).

Figure 9A:
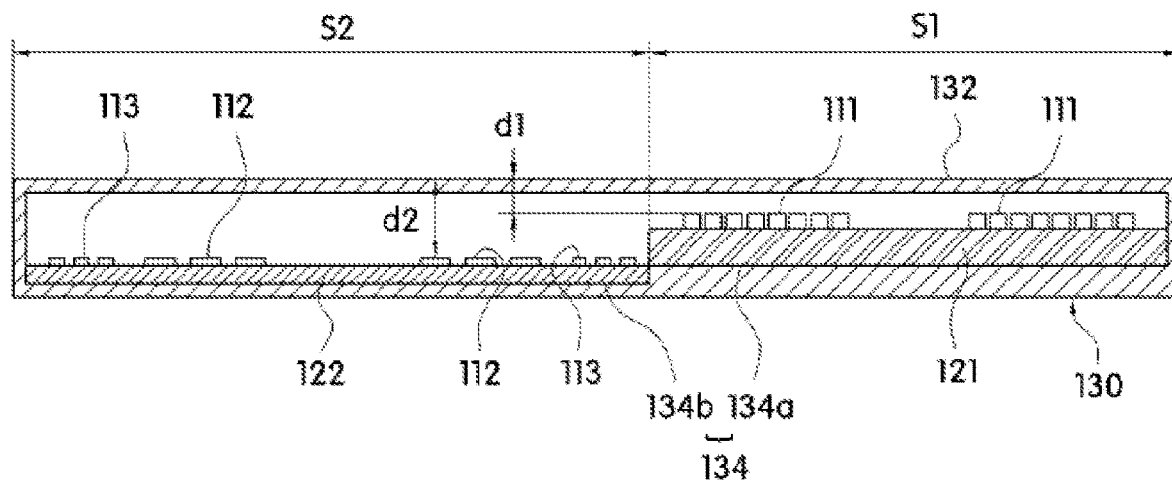
FIGS. 9A to 9C are views showing several exemplary structures of the wireless power transmission module for the vehicle to satisfy the arrangement that the NFC antenna is disposed in the second region and the first distance is shorter than the second distance in the wireless power transmission module for vehicle according to another embodiment of the present disclosure.
Figure 9B:
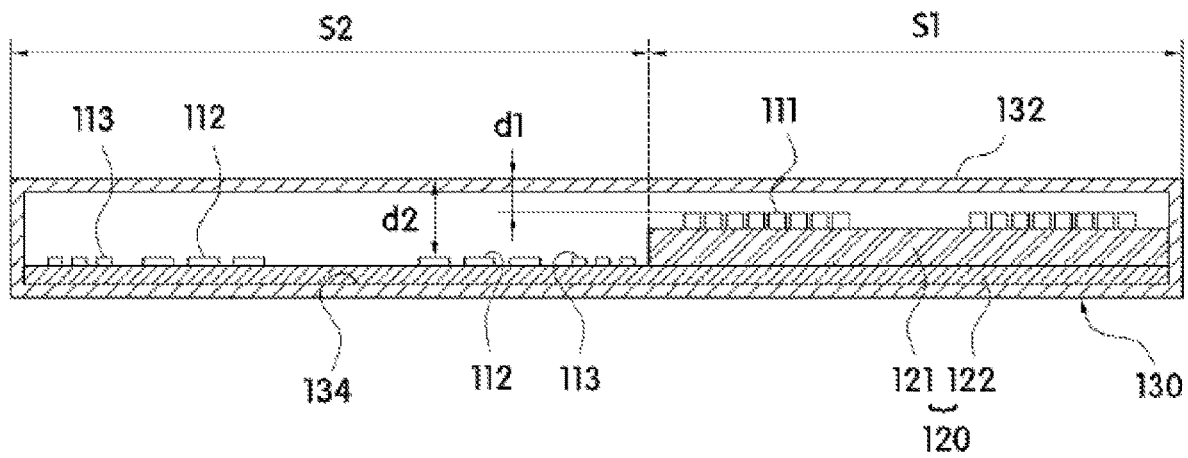
Figure 10A:
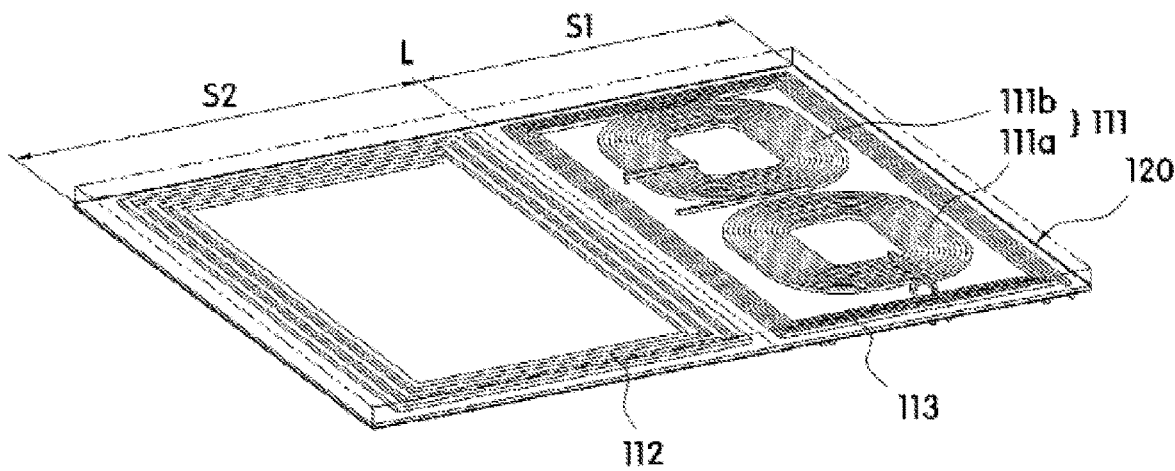
FIGS. 10A to 10C are views showing other structures of the wireless power transmission module for the vehicle to satisfy the arrangement that the NFC antenna is disposed in the first region and the second distance is longer than the first distance according to another embodiment of the present disclosure.
Figure 10B:
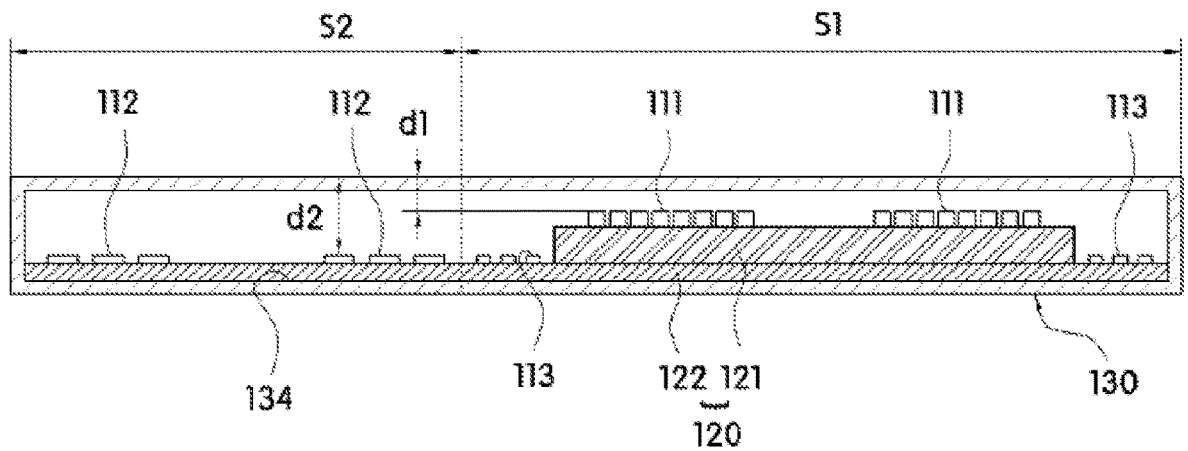

Further, when the second shielding sheet 122 is formed to have a large area which can fully cover both the first region S1 and the second region S2, the first shielding sheet 121 may be laminated on one side of the second shielding sheet 122 so as to be disposed in the first region S1 (refer to FIGS. 9B and 10B).

The NFC antenna 113 may be disposed in the first region S1 together with the first wireless power transmission antenna 111. When the first shielding sheet 121 and the second shielding sheet 122 are separately disposed on the first region S1 and the second region S2, respectively, a separate third shielding sheet 126 may be disposed on the first region S1 to improve the performance of the NFC antenna 113 (refer to FIG. 10C).

Meanwhile, the third shielding sheet 126 may have a relatively higher permeability than that of the first shielding sheet at the operating frequency of 13.56 MHz. When the first shielding sheet 121 and the third shielding sheet 126 have the same permeability at the operating frequency of 13.56 MHz, the permeability loss rate of the third shielding sheet 126 may be relatively smaller than that of the first shielding sheet 121. In addition, the third shielding sheet 126 may made from a material having a permeability of 100 to 250 and a Tan $\Delta(=\mu''/\mu')$ of 0.05 or less at the operating frequency of 13.56 MHz. For example, the third shielding sheet 126 may be a Ni—Zn ferrite sheet having a permeability of 100 to 250 and a Tan $\Delta(=\mu''/\mu')$ of 0.05 or less at the operating frequency of 13.56 MHz, and a metal polymer sheet having a permeability of 30 to 70 and a Tan $\Delta(=\mu''/\mu')$ of 0.05 or less at the operating frequency of 13.56 MHz.

Figure 10C:
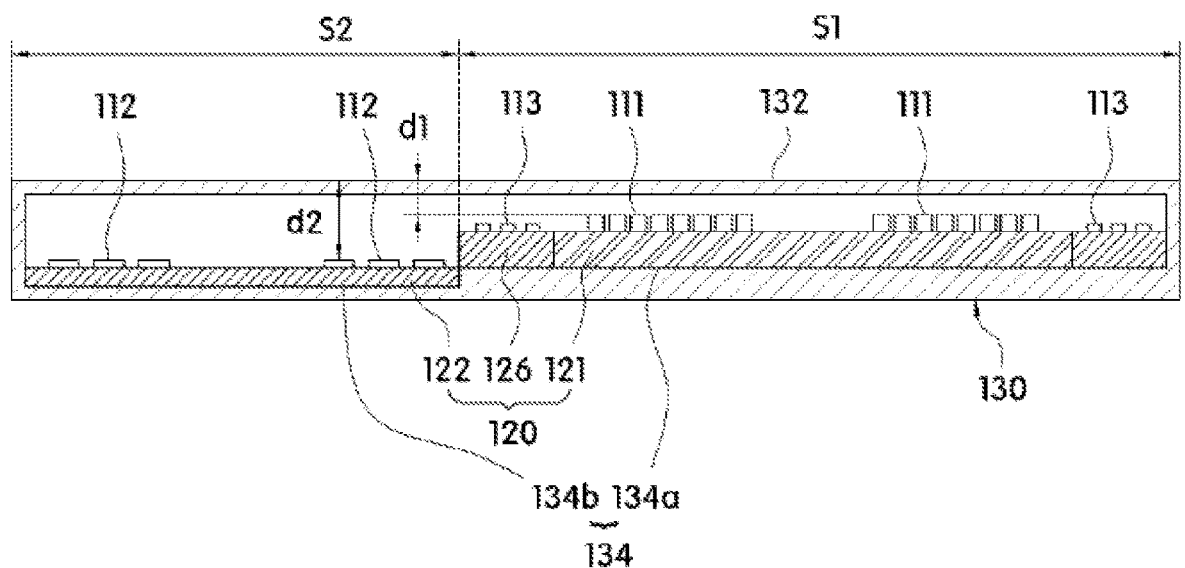

Here, as shown in FIG. 10C, the third shielding sheet 126 may be provided in a frame shape to surround the first shielding sheet 121 at a position corresponding to the NFC antenna 113 outside the first shielding sheet 121. However, the disposition of the third shielding sheet 126 and the first shielding sheet 121 is not limited thereto, and the third shielding sheet 126 may be stacked on a lower side of the first shielding sheet 121. When the first shielding sheet 121 is stacked on the upper side of the third shielding sheet 126, the third sheet 126 may be provided to accommodate a part of the thickness of the first shielding sheet 121.

The first shielding sheet 121 and the second shielding sheet 122 applied to the present disclosure may be provided to have different permeabilities or saturation magnetic fields in a predetermined frequency band. When the permeability of the first shielding sheet 121 is the same as the permeability of the second shielding sheet 122, the permeability loss rates may be different from each other.

More specifically, the first shielding sheet 121 may have a relatively higher permeability than that of the second shielding sheet 122 in the low operating frequency band of 100 kHz to 350 kHz, and a relatively higher saturation magnetic field than that of the second shielding sheet 122 in the operating frequency band of 100 kHz to 350 kHz. When the first shielding sheet 121 has the same permeability as the second shielding sheet 122 in the operating frequency band of 100 kHz to 350 kHz, the permeability loss rate of the first shielding sheet 121 may be a relatively lower than that of the second shielding sheet 122.

Here, the first shielding sheet 121 is made from a material of a magnetic permeability of 300 to 3500, a Tan $\Delta(=\mu''/\mu')$ of 0.05 or less and a saturation magnetic flux density of 0.25 T or more in the low operating frequency band of 100 kHz to 350 kHz.

For example, the first shielding sheet 121 may be a Mn—Zn ferrite sheet having a permeability of 2000 to 3500 and a Tan $\Delta(=\mu''/\mu')$ of 0.05 or less in the operating frequency band 100 kHz to 350 kHz, or a Ni—Zn ferrite sheet having a permeability of 300 to 1500 and a Tan $\Delta(=\mu''/\mu')$ of 0.05 or less in the operating frequency band 100 kHz to 350 kHz.

In addition, the second shielding sheet 122 may be have a relatively higher permeability than that of the first shielding sheet in the high operating frequency band of 6.765 MHz to 6.795 MHz and at the operating frequency of 13.56 MHz. When the first shielding sheet 121 and the second shielding sheet 122 have the same permeability in the high operating frequency band of 6.765 MHz to 6.795 MHz and at the operating frequency of 13.56 MHz, the permeability loss rate of the second shielding sheet 122 may be a relatively lower than that of the first shielding sheet 121.

Here, the second shielding sheet 122 is made from a material of a magnetic permeability of 30 to 350 and a Tan $\Delta(=\mu''/\mu')$ of 0.05 or less in the operating frequency band of 6.765 MHz to 6.795 MHz and at the operating frequency of 13.56 MHz and a saturation magnetic flux density of 0.25 T or more in the operating frequency band of 6.765 MHz to 6.795 MHz.

For example, the second shielding sheet 122 may be a Ni—Zn ferrite sheet having a permeability of 100 to 350 and a Tan $\Delta(=\mu''/\mu')$ of 0.05 or less in the operating frequency band of 6.765 MHz to 6.795 MHz and at the operating frequency of 13.56 MHz, or a metal polymer sheet having a permeability of 30 to 70 and a Tan $\Delta(=\mu''/\mu')$ of 0.05 or less in the operating frequency band of 6.765 MHz to 6.795 MHz and at the operating frequency of 13.56 MHz.

Accordingly, since the first shielding sheet 121 has a relatively higher permeability than that of the second shielding sheet 122 in the operating frequency band of 100 to 350 kHz, a time-varying magnetic field generated from the first wireless power transmission antenna 111 during wireless charging by the magnetic induction method may be induced to the first shielding sheet 121 having a relatively high permeability. Here, since the first shielding sheet 121 is disposed in an area corresponding to the first wireless power transmission antenna 111, the time-varying magnetic field induced to the first shielding sheet 121 may be shielded by the first shielding sheet 121 and efficiently transmitted to a wireless power receiving module side by condensing in a desired direction.

In addition, since the second shielding sheet 122 has a relatively higher magnetic permeability than that of the first sheet 121 in the operating frequency band of 6.765 MHz to 6.795 MHz, a time-varying magnetic field generated from the first wireless power transmission antenna 111 during wireless charging by the magnetic resonance method may be induced to the second shielding sheet 122 having a relatively higher permeability. Here, since the second shielding sheet 122 is disposed in an area corresponding to the second wireless power transmission antenna 112, the time-varying magnetic field induced to the second sheet 122 may be shielded by the second sheet 122 and efficiently transmitted to the wireless power receiving module side by condensing in a desired direction.

Further, since the second shielding sheet 122 has a relatively higher magnetic permeability than that of the first shielding sheet 121 at the operating frequency of 13.56 MHz, a magnetic field generated from the first wireless power transmission antenna 111 during data communication by NFC antenna 113 may be induced to the second shielding sheet 122 having a relatively higher permeability. Here, since the second shielding sheet 121 is disposed on an area corresponding to the NFC antenna 113, the magnetic field induced to the second shielding sheet 122 may be shielded by the second shielding sheet 122 and efficiently increased the performance of transmission/reception of data by condensing in a desired direction.

In addition, when the permeability loss rate of the first shielding sheet 121 is lower than that of the second shielding sheet 122 even if the first shielding sheet 121 and the second shielding sheet 122 have the same permeability in the operating frequency band of 100 to 350 kHz, the permeability loss according to the permeability loss rate may be reduced when the wireless charging is performed.

Accordingly, the time-varying magnetic field generated by the power transmission in the operating frequency band of 100 to 350 kHz may be induced to the first shielding sheet 121 having a relatively higher permeability. Thus, the time-varying magnetic field induced to the first shielding sheet may be efficiently transmitted to the wireless power receiving module side through the first wireless power transmission antenna 111 disposed on an area corresponding to the first shielding sheet 121.

Likewise, when the permeability loss rate of the second shielding sheet 122 is lower than that of the first shielding sheet 121 even if the first shielding sheet 121 and the second shielding sheet 122 have the same permeability in the operating frequency band of 6.765 MHz to 6.795 MHz and at the operating frequency of 13.56 MHz, the loss of permeability according to the permeability loss rate may be reduced when the wireless charging or data communication is performed.

Accordingly, the time-varying magnetic field generated by the power transmission in the operating frequency band of 6.765 MHz to 6.795 MHz and at the operating frequency of 13.56 MHz may be induced to the second shielding sheet 122 having a relatively higher permeability. Thus, the time-varying magnetic field induced to the second shielding sheet 122 may be efficiently transmitted power or data through the second wireless power transmission antenna 112 or NFC antenna 113 disposed in an area corresponding to the second shielding sheet 122.

Here, a Mn—Zn ferrite sheet or a Ni—Zn ferrite sheet is used as the first shielding sheet 121, and a Ni—Zn ferrite sheet or a metal polymer sheet is used as the second shielding sheet 122. However, the present disclosure is not limited thereto. The material of the first shielding sheet 121 and the second shielding sheet 122 may be variously changeable as long as the permeability, the saturation magnetic field, and the permeability loss rate satisfy the relative conditions with respect to each other shielding sheet in the corresponding frequency band.

In an exemplary embodiment, the first shielding sheet 121 and the second shielding sheet 122 may be made from the same material having different magnetic permeabilities in the operating frequency band of 100 to 300 kHz, in the operating frequency band of 6.765 MHz to 6.795 MHz, and at the operating frequency of 13.56 MHz. The ribbon sheet including at least one of an amorphous alloy and a nanocrystalline alloy may be used as the first shielding sheet 121. Even if they are made of the same material, they can be manufactured to have different characteristics (permeability, saturation magnetic field, permeability loss rate, etc.) through various conditions such as the heat treatment temperature, the number of layers, etc.

In addition, when at least one of the first shielding sheet 121 and the second shielding sheet 122 include a ribbon sheet including at least one of an amorphous alloy and a nano-crystal alloy, the first shielding sheet 121 and the second shielding sheet 122 may be a single layer ribbon sheet. However, as shown in FIG. 12, the first shielding sheet 121 and the second shielding sheet 122 may have a multilayer structure, in which a plurality of ribbon sheets are stacked.

The wireless power transmission module for the vehicle 100 or 200 may be set to have different distances of a first distance d1 from the first wireless power transmission antenna 111 to the outer surface of the upper plate 132 and a second distance d2 from the second wireless power transmission antenna 112 to the outer surface of the upper plate 132.

That is, when the portable device to be charged is placed on the outer surface of the upper plate 132 for wireless charging, it is to make a difference distance between the first distance d1 from the first wireless power transmission antenna 111 operating in the magnetic induction method to the portable device and the second distance d2 from the wireless power transmission antenna 112 operating in a magnetic resonance method to the portable device.

Generally, as the distance between a transmission coil (Tx coil) provided in a wireless power transmission module and a reception coil (Rx coil) provided in a wireless power reception module is shorter, a value of the coupling coefficient between the transmission coil and the reception coil is larger. As the distance between the transmission coil and the reception coil is longer, the value of the coupling coefficient between the transmission coil and the reception coil is smaller. When wireless charging is performed by the magnetic resonance method, it may be preferable that the coupling coefficient k between the transmission coil and the reception coil is less than 0.2. When wireless charging is performed by the magnetic induction method, it may be preferable that the coupling coefficient k between the transmission coil and the reception coil is 0.7 or more.

In case of the magnetic resonance method, if the coupling coefficient between the coils is 0.2 or more, the efficiency is lowered by the splitting and the charging efficiency is rather lowered. Therefore, the coupling coefficient between the reception coil and the transmission coil may be set to less than 0.2. However, in case of the magnetic induction method, unlike the magnetic resonance method, the larger coupling coefficient value, the higher charging efficiency. Therefore, the distance between the reception coil and the transmission coil may be set to as short as possible.

Accordingly, in the present disclosure, the first distance d1 from the first wireless power transmission antenna 111 operating in the magnetic induction method to the portable device may be set to have different distance from the second distance d2 from the second wireless power transmission antenna 112 operating in a magnetic resonance method to the portable device, according to wireless charging methods. When the wireless charging is performed, the coupling coefficient between the reception coil included in the portable device and the first wireless power transmission antenna 111 may be set to less than 0.2, and the coupling coefficient between the reception coil included in the portable device and the second wireless power transmission antenna 112 may be set 0.7 or more, thereby increasing the charging efficiency in both methods.

The antenna unit 110 according to the present disclosure may be placed inside the housing 130 so that the first distance d1 from the first wireless power transmission antenna 111 to the upper plate 132 of the housing 130 is smaller than the second distance d2 from the second wireless power transmission antenna 112 to the upper plate 132 of the housing 130.

Here, the housing 130 may be embedded in a dashboard, a gear box, or the like of the vehicle so that one surface of the upper plate 132 is exposed to outside. The exposed surface of the upper plate 132 may serve as a contact surface or a seating surface on which the portable device to be charged is placed.

Figure 8:
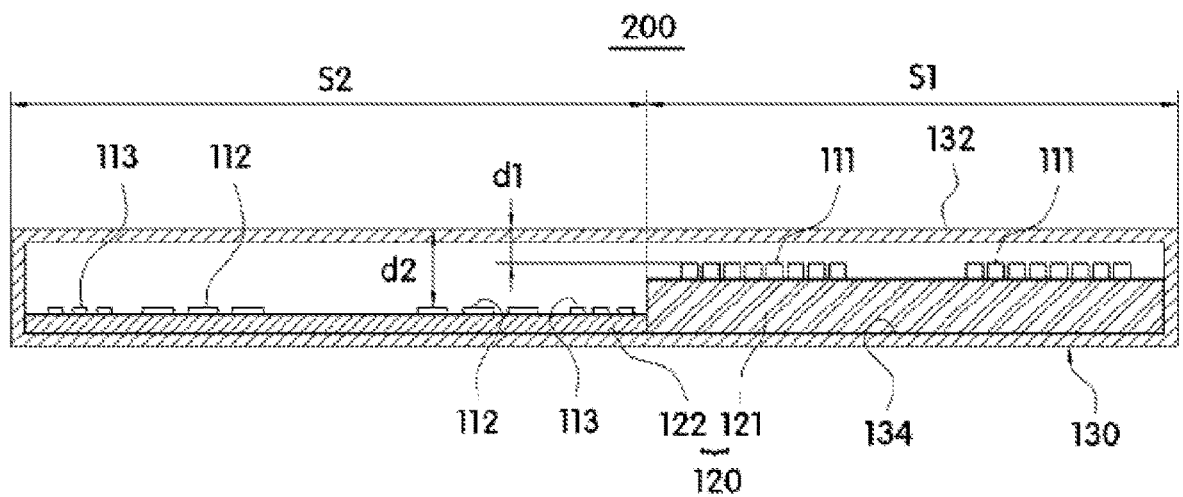
FIG. 8 is a cross-sectional view along the line A-A in FIG. 6.

As shown in FIGS. 3 and 8, the first and second distances d1 and d2 may refer to the straight-line distance from the wireless power transmission antennas 111 and 112 to the outer surface of the upper plate on which the portable device is placed. The first distance d1 may be 2 mm to 5 mm and the second distance d2 may be 10 mm to 50 mm.

Accordingly, if the user tries to charge the battery of the portable device, when the portable device is placed on upper plate 132 of the housing, a distance between the portable device and the first wireless power transmission antenna 111 may be a relatively shorter distance, for example, 2 mm to 5 mm, while a distance between the portable device and the second wireless power transmission antenna 112 may be a relatively longer distance, for example, 10 mm to 50 mm, thereby improving the charging efficiency.

For this, several exemplary structures are shown in FIGS. 3 to 4B and FIGS. 8 to 10C.

More specifically, a surface of the first shielding sheet 121 on which the first wireless power transmission antenna 111 is disposed may be a stepped surface having a height difference with respect to a surface of the second shielding sheet 122 on which the second wireless power transmission antenna 121 disposed. The stepped surface formed by a surface of the first sheet 121 and a surface of the second sheet 122 may formed by different thicknesses of the first shielding sheet 121 and the second shielding sheet 122, by laminating the first shielding sheet on a side of the second shielding sheet, or by a stepped surface formed by seating surfaces 134 on which the first shielding sheet 121 and the second shielding sheet 122 are seated.

In addition, the outer surface of the upper plate 132 on which the portable device to be charged is placed may be formed as a stepped surface, so that the portable device may maintain an appropriate distance from the antenna for the wireless charging.

The first distance d1 from the first wireless power transmission antenna 111 disposed on the upper surface of the first shielding sheet 121 to the outer surface of the upper plate 132 of the housing 130 may be set to a shorter distance than the second distance d2 from the second wireless power transmission antenna 112 disposed on the upper surface of the second shielding sheet 122 to the outer surface of the upper plate 132 of the housing 130.

As a specific example, the first shielding sheet 121 is provided to have a relatively smaller area than that of the second shielding sheet 122. By stacking the first shielding sheet on a side of the second shielding sheet 122, a surface of the first shielding sheet 121 and the second shielding sheet 122 may form a stepped surface (refer to FIGS. 3, 4B, 9B and 10B).

In another exemplary embodiment, the first shielding sheet 121 may formed to have a relatively thicker thickness than that of the second shielding sheet 122, and a surface of the first shielding sheet 121 and the second shielding sheet 122 may be contacted with the seating surface 134, respectively, so that the upper surface of the first shielding sheet 121 and the upper surface of the second shielding sheet 122 may be formed a stepped surface (refer to FIGS. 4A and 8).

In another exemplary embodiment, the seating surface 134 of the housing 130 where the first and second shielding sheets 121 and 122 are disposed may include a first portion 134a and a second portion 134b having different heights. (refer to FIGS. 9A and 10C). The first shielding sheet 121 may be disposed on the first portion 134a having a relatively higher height and the second shielding sheet 122 may be disposed on the second portion 134b having a relatively lower height. Here, the seating surface 134 may be an inner bottom surface of the housing 130, or a separate supporting member having a predetermined height placed apart from the bottom surface of housing 130.

Figure 9C:
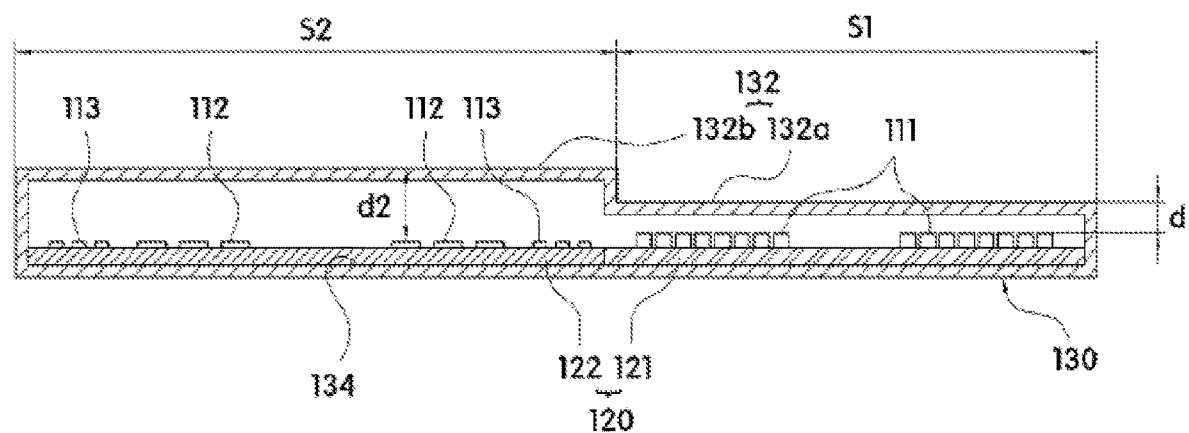

Alternatively, the upper plate 132 on which the portable device is placed may be formed a stepped surface by configuring that the first distance d1 is shorter than the second distance d2 (refer to FIG. 9C). That is, the upper plate 132 may include a first upper plate 132a disposed in an upper area of the first wireless power transmission antenna 111 and a second upper plate 132b disposed in an upper area of the second wireless power transmission antenna 112. An outer surface of the first upper plate 132a may form a stepped surface having a height difference with respect to an out surface of the second upper plate 132b.

Although not shown in the drawings, the thickness of the first shielding sheet 121 and the second shielding sheet 122 may be different, the upper plate 132 may be formed to have a stepped surface, and the seating surface 134 may be formed to have a stepped surface, and it should be noted that the three arrangements may be appropriately combined.

Accordingly, when wireless charging is performed in the portable device using the wireless power transmission modules 100 and 200 for the vehicle according to the present disclosure, it is possible to maintain a proper distance between the portable device and the wireless power transmission antenna 111 and 112 for increasing the charging efficiency through the above-described stepped surface by placing the portable device on the upper plate 132 without performing a specific operation.

That is, when the portable device is to be charged by the magnetic induction method, the distance between the first wireless power transmission antenna 111 and the portable device may set to as short as possible by maintaining the coupling coefficient of 0.7 or more. When the portable device is to be charged by the magnetic resonance method, the distance between the second wireless power transmission antenna 112 and the portable device may set to a proper distance by maintaining the coupling coefficient of less than 0.2. Thus, it is advantageous to improve the charging efficiency by preventing splitting due to excessive coil coupling and obtaining a uniform magnetic field distribution on the surface of the upper plate 132 of the housing 130.

As described above, the present disclosure has been described with respect to particularly preferred embodiments. However, the present disclosure is not limited to the above embodiments, and it is possible for one who has an ordinary skill in the art to make various modifications and variations, without departing off the spirit of the present disclosure.

What is claimed is:

1. A wireless power transmission module for a vehicle comprising:
   a housing providing an internal space and including an upper plate on which a portable device to be charged is placed;

an antenna unit including a first wireless power transmission antenna operating in a magnetic induction method and a second wireless power transmission antenna operating in a magnetic resonance method; and a shielding unit including a first shielding sheet disposed in an area corresponding to the first wireless power transmission antenna and a second shielding sheet disposed in an area corresponding to the second wireless power transmission antenna;

wherein the antenna unit is placed inside the housing so that a first distance from the first wireless power transmission antenna to an outer surface of the upper plate is shorter than a second distance from a second wireless power transmission antenna to an outer surface of the upper plate, wherein the first distance is set so that a coupling coefficient k between a reception coil included in the portable device and the first wireless power transmission antenna is 0.7 or more, and the second distance is set so that a coupling coefficient k between the reception coil included in the portable device and the second wireless power transmission antenna is less than 0.2.

2. The wireless power transmission module for the vehicle of claim 1, wherein the first distance is 2 mm to 5 mm, and the second distance is 10 mm to 50 mm.

3. The wireless power transmission module for the vehicle of claim 1, wherein the first wireless transmission antenna includes a first antenna operating in a Qi standard method and a second antenna operating in a power matters alliance (PMA) standard method.

4. The wireless power transmission module for the vehicle of claim 1, wherein the first shielding sheet on which the first wireless power transmission antenna is disposed is a stepped surface having a height difference with respect to a surface the second shielding sheet on which the second wireless power transmission antenna is disposed.

5. The wireless power transmission module for the vehicle of claim 4, wherein the surface of the first shielding sheet on which the first wireless power transmission antenna is disposed is higher by a predetermined height than the surface of the second shielding sheet on which the second wireless power transmission antenna is disposed.

6. The wireless power transmission module for the vehicle of claim 4, wherein the first shielding sheet has a relatively smaller area than that of the second shielding sheet, and is stacked on a side of the second shielding sheet.

7. The wireless power transmission module for the vehicle of claim 4, wherein the first shielding sheet is disposed inside the second shielding sheet and the second shielding sheet is formed with a receiving portion for receiving a part or all of an entire thickness of the first shielding sheet.

8. The wireless power transmission module for the vehicle of claim 1, wherein the first wireless power transmission antenna and the second wireless power transmission antenna is disposed on a first region and a second region, respectively which are located on opposite sides with respect to a virtual boundary line.

9. The wireless power transmission module for the vehicle of claim 8, wherein the housing includes a seating surface on which the first shielding sheet and the second shielding sheet are seated, and the seating surface includes a first portion on which the first shielding sheet is disposed and a second portion on which the second shielding sheet is disposed, wherein a surface of the second portion forms a stepped surface having a height difference with respect to a surface of the first portion.

10. The wireless power transmission module for the vehicle of claim 8, wherein the first shielding sheet is disposed in the first region, the second shielding sheet is disposed in the second region, and wherein the first shielding sheet has a relatively thicker thickness than that of the second shielding sheet.

11. The wireless power transmission module for the vehicle of claim 1, wherein the upper plate includes a first upper plate disposed in an upper area of the first wireless power transmission antenna and a second upper plate disposed in an upper area of the second wireless power transmission antenna, wherein an outer surface of the first upper plate forms a stepped surface having a height difference with respect to an outer surface of the second upper plate.

12. The wireless power transmission module for the vehicle of claim 1, wherein the antenna unit further includes a near field communication (NFC) antenna for short range data communication.

13. The wireless power transmission module for the vehicle of claim 8, wherein the NFC antenna is disposed in an area corresponding to the second shielding sheet.

14. The wireless power transmission module for the vehicle of claim 1, wherein the first shielding sheet has a relatively higher permeability than that of the second shielding sheet in an operating frequency band of 100 kHz to 350 kHz, or when the first shielding sheet has the same permeability as the second shielding sheet, the permeability loss rate of the first shielding sheet is smaller than that of the second shielding sheet.

15. The wireless power transmission module for the vehicle of claim 1, wherein the second shielding sheet has a relatively higher permeability than that of the first shielding sheet in the operating frequency band of 6.765 MHz to 6.795 MHz and at the operating frequency of 13.56 MHz, or when the second shielding sheet has the same permeability as the first shielding sheet, the permeability loss rate of the second shielding sheet is smaller than that of the first shielding sheet.

16. The wireless power transmission module for the vehicle of claim 1, wherein the first shielding sheet is made from a material having a magnetic permeability of 300 to 3500, a Tan $\Delta(=\mu''/\mu')$ of 0.05 or less, and a magnetic flux density of 0.25 T or more in the operating frequency band of 100 kHz to 350 kHz, wherein the second shielding sheet is made from a material having a magnetic permeability of 30 to 350, a Tan $\Delta(=\mu''/\mu')$ of 0.05 or less in the operating frequency band of 6.765 MHz to 6.795 MHz and at the operating frequency of 13.56 MHz and a magnetic flux density of 0.25 T or more in the operating frequency band of 6.765 MHz to 6.795 MHz (Here, $\mu'$ is the permeability and $\mu''$ is the permeability loss rate).

17. The wireless power transmission module for the vehicle of claim 16, wherein the first shielding sheet is any one of a Mn—Zn ferrite sheet having a permeability of 2000 to 3500 and Tan $\Delta(=\mu''/\mu')$ of 0.05 or less in the operating frequency band of 100 kHz to 350 kHz, and a Ni—Zn ferrite sheet having a permeability of 300 to 1500 and Tan $\Delta(=\mu''/\mu')$ of 0.05 or less in the operating frequency band of 100 kHz to 350 kHz, wherein the second shielding sheet is any one of a Ni—Zn ferrite sheet having a permeability of 100 to 350 and Tan $\Delta(=\mu''/\mu')$ of 0.05 or less in the operating frequency band of 6.765 MHz to 6.795 MHz and at the operating frequency of 13.56 MHz, and a metal polymer sheet having a permeability of 30 to 70 and Tan $\Delta(=\mu''/\mu')$ of 0.05 or less in the operating frequency band of 6.765 MHz to 6.795 MHz.

18. The wireless power transmission module for the vehicle of claim 1, wherein the first shielding sheet and the second shielding sheet include at least one of a ribbon sheet including at least one of an amorphous alloy and a nanocrystalline alloy, a ferrite sheet and a metal polymer sheet.

19. The wireless power transmission module for the vehicle of claim 1, wherein any one of the first shielding sheet and the second shielding sheet includes a plurality of divided fine pieces.

\* \* \* \* \*